United States Patent
Santos et al.

(10) Patent No.: US 12,553,302 B2
(45) Date of Patent: Feb. 17, 2026

(54) ELECTRICAL DOWNHOLE BACKDRIVABLE (EDB) ACTUATOR

(71) Applicant: Halliburton Energy Services, Inc., Houston, TX (US)

(72) Inventors: Jefferson Koloda dos Santos, Rio de Janeiro (BR); Samuel Amora Alves Neto, Rio de Janeiro (BR); Sanjay Kanwarlal, Rio de Janeiro (BR)

(73) Assignee: Halliburton Energy Services, Inc., Houston, TX (US)

( * ) Notice: Subject to any disclaimer, the term of this patent is extended or adjusted under 35 U.S.C. 154(b) by 45 days.

(21) Appl. No.: 18/523,551

(22) Filed: Nov. 29, 2023

(65) Prior Publication Data

US 2025/0172049 A1    May 29, 2025

(51) Int. Cl.
*E21B 34/06* (2006.01)
*E21B 23/02* (2006.01)

(52) U.S. Cl.
CPC ............ *E21B 23/02* (2013.01); *E21B 34/066* (2013.01)

(58) Field of Classification Search
CPC ................. E21B 34/066; F16D 2041/0608
See application file for complete search history.

(56) References Cited

U.S. PATENT DOCUMENTS

| | | | |
|---|---|---|---|
| 4,253,554 A | 3/1981 | Nisenson | |
| 4,848,508 A * | 7/1989 | Smirl | B60K 17/3465 188/DIG. 1 |
| 5,417,544 A | 5/1995 | Mohn | |
| 6,364,023 B1 * | 4/2002 | Hiron | E21B 34/066 166/373 |
| 6,550,594 B1 * | 4/2003 | Peura | F16D 41/10 192/93 A |

(Continued)

FOREIGN PATENT DOCUMENTS

| | | |
|---|---|---|
| CN | 112443272 | 3/2021 |
| GB | 2300441 | 4/1997 |

OTHER PUBLICATIONS

"Two Way Clutch", The Bi-directional Overrunning Clutch is designed based on a picture found in an internet catalogue and the vendoris NTN Global https://www.ntnglobal.com/en/products/catalog/pdf/2900E.pdf, 30 pages.

(Continued)

*Primary Examiner* — Giovanna Wright
(74) *Attorney, Agent, or Firm* — DeLizio, Peacock, Lewin & Guerra LLP

(57) ABSTRACT

Embodiments of a bi-directional overrunning clutch and an electric downhole backdrivable actuator are disclosed. In one embodiment, an actuator is coupled with a target mechanism positioned downhole, the actuator comprising: a housing; a motor; a dynamic sealing system; a ball screw and ball nut; and an engagement system; wherein the ball screw includes a slide rod extending from a distal end of the housing and configured to connect with the target mechanism. In one embodiment, the engagement mechanism is a bi-directional overrunning clutch comprising: an input shaft, the input shaft having a multi-surface profile at a distal end thereof having a plurality of engagement surfaces; a clutch body comprising a cage and a plurality of rollers within the cage; and an output shaft; wherein the plurality of rollers are configured to engage the plurality of engagement surfaces and the output shaft as the input shaft rotates.

18 Claims, 8 Drawing Sheets

(56) References Cited

U.S. PATENT DOCUMENTS

| | | |
|---|---|---|
| 10,982,506 B2 | 4/2021 | Eriksen |
| 2002/0108747 A1* | 8/2002 | Dietz .................. E21B 34/066 |
| | | 166/66.4 |
| 2009/0211762 A1 | 8/2009 | Voss |
| 2013/0140029 A1 | 6/2013 | Sullivan et al. |
| 2013/0248203 A1 | 9/2013 | Scott et al. |
| 2014/0166370 A1 | 6/2014 | Silva |
| 2017/0058971 A1 | 3/2017 | Bedarrides et al. |
| 2019/0022773 A1* | 1/2019 | Choi ........................ B23C 3/12 |

OTHER PUBLICATIONS

"PCT Application No. PCT/US2023/081977 International Search Report and Written Opinion", Oct. 10, 2024, 13 pages.

* cited by examiner

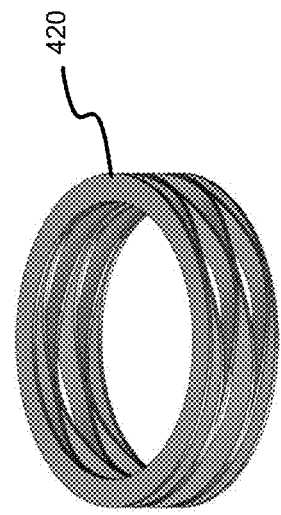
FIG. 4C
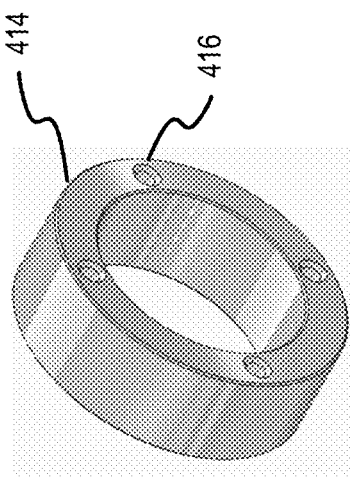
FIG. 4E
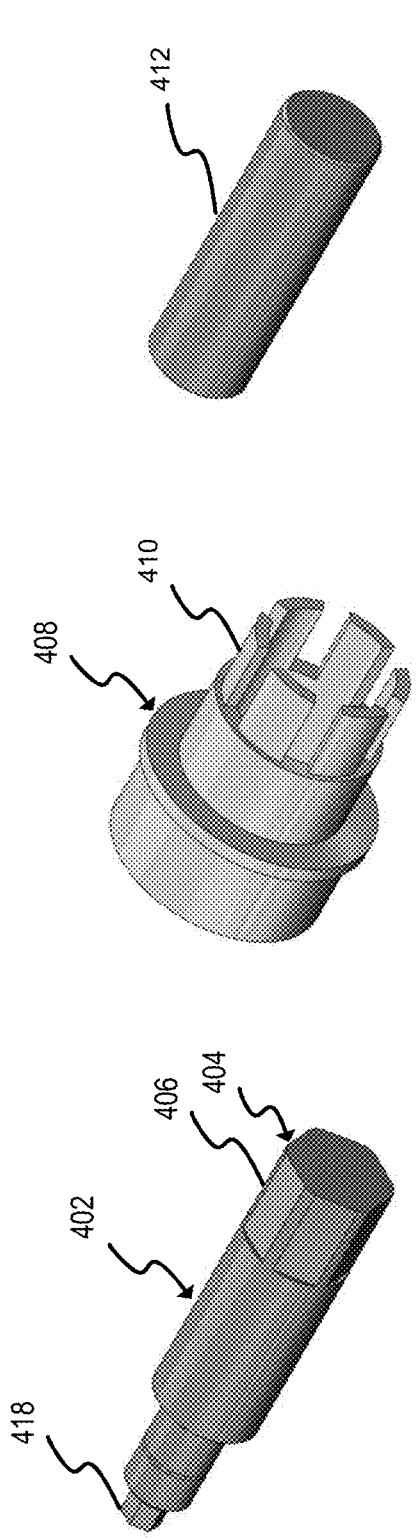
FIG. 4B
FIG. 4A
FIG. 4D

ELECTRICAL DOWNHOLE BACKDRIVABLE (EDB) ACTUATOR

BACKGROUND

Hydrocarbons, such as oil and gas, are commonly obtained from subterranean formations that may be located onshore or offshore. The development of subterranean operations and the processes involved in removing hydrocarbons from a subterranean formation may be complex. Typically, subterranean operations involve a number of different steps such as, for example, drilling a wellbore, at a desired well site, treating the wellbore to optimize production of hydrocarbons, and performing the necessary steps to produce and process the hydrocarbons from the subterranean formation.

Drilling a wellbore may include introducing a drill bit into the formation and rotating the drill bit to extend the wellbore. In certain operations, it may be necessary to control the direction in which the wellbore is being extended by altering the axis of the drill bit with respect to the wellbore. This is typically accomplished using complex mechanisms that increase the costs associated with the drilling operation.

BRIEF DESCRIPTION OF THE DRAWINGS

Embodiments of the disclosure may be better understood by referencing the accompanying drawings.

FIG. 4A-4E are perspective views of components of a bi-directional over-running clutch, according to some embodiments.

DESCRIPTION

Figure 1:
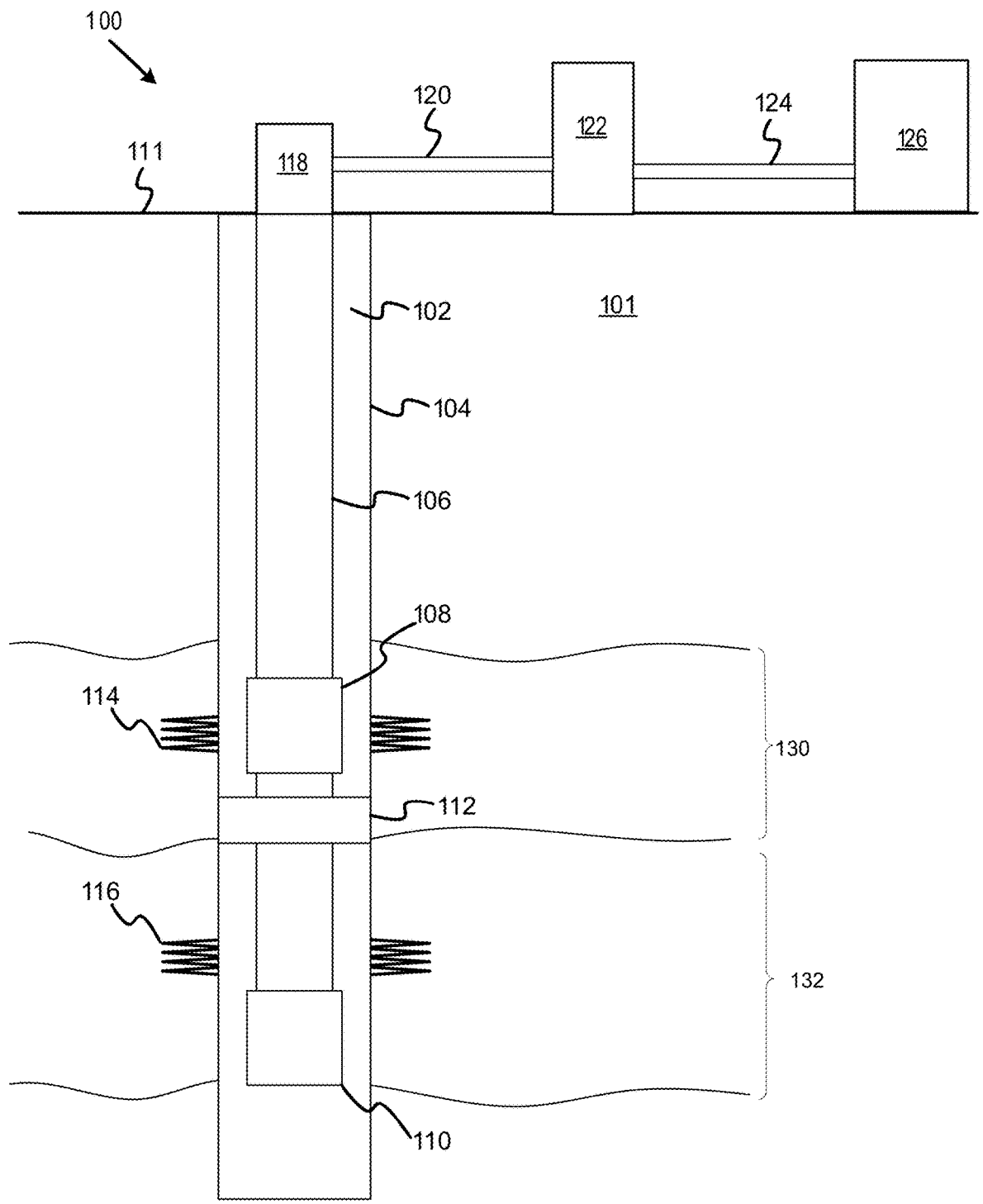
FIG. 1 is a schematic view of a well system, according to some embodiments.

The description that follows includes example systems, methods, techniques, and program flows that embody aspects of the disclosure. However, it is understood that this disclosure may be practiced without these specific details. In some instances, well-known instruction instances, protocols, structures, and techniques have not been shown in detail in order not to obfuscate the description.

Currently, a downhole environment in wellbore has many devices that may use hydraulic power to operate, and more specifically, to displace the parts of those devices from one position to another. Examples of these devices may include downhole valves, including but not limited to ball valves, sliding sleeve valve, chemical injection valves, gas lift valves, and interval control valves (ICV), as well as lock and latch systems, packers, and flappers.

A recent industry demand has requested that hydraulic power systems be replaced with electric power systems; however, the electrical power limitation and the requirement for tools to not need maintenance, which in some cases may be required over a period of 20 years or more, present challenges. To deal with a challenge of requiring no maintenance, both redundant drive systems and/or override tools may be applied. Embodiments of an electrical downhole backdrivable (EDB) actuator disclosed herein allows both override intervention and redundant actuator systems in its normal operation.

Embodiments of an EDB actuator for use in a downhole system or wellbore environment are disclosed herein. The EDB actuator may be a stand-alone or be used with redundant actuators, to operate target mechanisms including valves, lock and latch systems, packers, flappers and/or any other devices which may be placed in a wellbore completion or a fracking system. Embodiments of the EDB actuator may include an electric motor coupled with an engagement system, wherein the engagement system may be used to both engage and/or disengage the actuator. The actuator may include a ball-screw and ball nut supported by a thrust bearing. The components of the actuator may be encapsulated by at least one actuator housing containing lubricant such as oil or dielectric oil therein. The oil may compress and expand. Any volume displacement may be compensated by at least one compensator coupled with the actuator housing, wherein the compensator may include a bellows, piston, bladder, diaphragm, or other suitable components. The ball screw has a slide rod that protrudes outside the actuator housing and may be coupled with a target downhole component (such as valve, flapper, packer, etc). The actuator may also include a dynamic sealing system that seals an inner chamber within the housing against an external downhole environment, such as a downhole annulus or wellbore tubing. In some embodiments, the motor may be positioned in a chamber and may have one or more rotating seals for increasing security of the motor against contamination from other components. In some embodiments, there may only be one uniform chamber and a rotating seal may not be needed. When the motor rotates in a clockwise or counter-clockwise direction, the engagement system will engage and transfer the movement to the ball-screw and thus the slide rod is extended or retracted outside the actuator housing, pushing or pulling the load related to the target mechanism. The ball-screw will rotate in the same direction as the motor.

The engagement system allows the actuator to be run by the slide rod (overrunning mode) with an external force without damaging the actuator and motor, and may also enable the use of more than one actuator on the system, such as redundant actuators that may be fixed, coupled or touching on the same target mechanism/downhole tool, without any other switch or latching system. The engagement system also enables a downhole system to switch to a second or third actuator if the first actuator is not working properly without the use of an external or intervention tool or requiring an override system on the output/slide rod or on any parts connected thereto. Depending on the system power and firmware the engagement system can also add the possibility to run in a case where more load may be required than one actuator has capacity to provide. Further, if an external tool may be needed to actuate the target mechanism, the actuator may maintain its normal operating placement and condition.

Additional benefits of the actuator combined with an engagement system such as a bi-directional overrunning clutch disclosed herein allow overriding and operation as an intervention while maintaining/preserving the normal actuator operation. The use of the engagement system such as embodiments of the clutch disclosed herein allows the use of redundant motors without any external switch method required. The operation of downhole devices with low power coming from the surface of the wellbore.

Currently, there are no existing electric actuators capable of allowing redundancy or override operation without some external switch system, nor are there any existing electric actuators able to operate downhole devices without intervention-current embodiments require the use of coiled tubing, wireline and/or slickline tools. Embodiments of the actuator disclosed herein do still allow an override operation using coiled tubing, wireline and slickline tools if needed to break a possible scaling formation or other incrustation that would extrapolate the capacity load of the electrical actuator while maintaining the actuator's normal operation. For example, if the actuator is not able to run a downhole tool, such as, e.g., a valve, due to an abnormal behavior, after using an external tool to stroke the valve by override system, the actuator can maintain its normal function.

Also disclosed herein are embodiments of an engagement system. In some downhole completion and fracking applications, certain components, such as but not limited to production valves may use one or more actuators. In some embodiments, there may be two or more actuators including a main actuator and redundant actuator, to provide redundancy in the actuation system. A redundant system also provides increased reliability. However, previously available engagement systems (such as a traditional clutch) may cause harm to various other components in a system. What is needed is an engagement system that can engage and disengage an actuator without causing harm to the actuator, both when used in maintaining normal operations and also when an override or intervention may be required. In addition, an engagement system is needed that can permanently disengage and override the actuator or actuation system when it fails, for example to open or close a valve such as an interval control valve (ICV). Provided herein is a bi-directional overrunning clutch ("clutch") that can engage and disengage an actuator without causing harm. For example, embodiments of the clutch can backdrive the actuator without applying torque to the motor.

Embodiments of the bi-directional overrunning clutch may include an input shaft having a multi-surface profile at a distal end thereof. The multi-surface profile may have a plurality of engagement surfaces. A clutch body may include a cage at a distal end of the clutch body which may be positioned about the input shaft. The cage may include openings for a plurality of rollers to be placed within the cage. An output shaft may be coupled with the clutch body about the cage. The plurality of rollers are configured to engage the plurality of engagement surfaces to transfer motion and torque to the output shaft as the input shaft rotates. The rollers may automatically engage and disengage from the input and output shaft, such that as rotation of the input shaft changes or stops, the rotation of the output shaft automatically changes or stops. The clutch accordingly may therefore engage and disengage an actuator in a controlled manner. The clutch may use an anti-rotational friction force that allows the input shaft to automatically switch the rotational direction.

Embodiments of a Bi-directional Overrunning Clutch ("clutch") disclosed herein provide an engagement system capable of switchover between an engaged drive mode, either clockwise (CW) or counterclockwise (CCW), and an overrunning (or idle) mode. Directional rotation of the input shaft automatically drives rotation of the output shaft without requiring any electronic mechanism to switch between overrunning mode and one of the two engaged modes (CW or CCW).

Embodiments of the bi-directional overrunning clutch have not previously been used or applied in downhole environments. While similar bi-directional clutches may be available, these available clutches require an external system to switch the rotational direction and cannot switch the rotational direction automatically, as described herein. Further, previously known bi-directional clutches, such as those used in aircraft applications, are not configured for the temperature and pressure conditions present in most downhole environments.

Embodiments of the clutch described herein provide several advantages over traditional clutches which may currently be used as engagement systems in downhole environments. No extra power consumption than the rotation of the motor present on EBD actuator is required to engage and disengage the clutch. The clutch automatically engages, caused primarily by angular rotation of the input shaft. Embodiments of the clutch may provide high torque capability, and embodiments may provide both temporary and permanent disengagement capabilities for downhole components for which the clutch may be used as an engagement mechanism.

Embodiments of the bi-directional overrunning clutch may be used in several downhole applications. Examples provided herein are shown used with completion tools requiring both a drive/engaged mode (CW and CCW) and an overrunning mode in the same equipment. The drive mode is required when the input shaft of the clutch rotates and transmits the movement to the output shaft of the clutch in the same direction. The overrunning mode is required when the output shaft of the clutch rotates freely and no movement is transferred to the input shaft. Embodiments of the bi-directional overrunning clutch can be used when a redundancy system is required and may also be used when an intervention from an additional tool may be required when a main actuator or redundant actuator do not have enough force move the load.

Example Embodiments

FIG. 1 is a diagrammatic illustration of an example well system, according to some implementations. In particular, FIG. 1 is a schematic of a well system 100 that includes a wellbore 102 in a subsurface formation 101. The wellbore 102 includes casing 104 and number of perforations 114, 116 being made in the casing 104. Each set of perforations 114, 116 is located in a respective reservoir 130, 132 to allow reservoir fluids (i.e., oil, water, and gas) from the respective reservoirs 130, 132 to flow into the wellbore 102 and into the tubular string 106 (the production tubing). The tubular string 106 includes at least a packer 112 that may prevent the comingling of fluids produced from the reservoirs 130, 132 in the wellbore 102. A production assembly 108 may allow the inflow of fluid produced from the reservoir 130 into the tubular string 106. Likewise, a production assembly 110 may allow the inflow of fluid produced from the reservoir 132 into the tubular string 106.

In some embodiments, the production assemblies 108, 110 may include one or more components requiring electric, rather than hydraulic, power. The one or more components may include one or more valves, such as production valves, one or more interval control valves, ports, packers, sleeves, or other components which may be used to control flow into, or out of the well system 100, as well as lock and latch systems, packers, and flappers. The well system 100 may also include an actuator, such as an EDB actuator for actuating the one or more components in the production assemblies 108, 110. Embodiments of an EDB actuator disclosed herein may be electrically powered and be used to actuate the one or more valves, sliding sleeves, packers, ports, or other components, to control flow into or out of the well system 100 as well as lock and latch systems, packers, and flappers. Embodiments of the EDB actuator may utilize an engagement system, such as a bi-directional over-running clutch disclosed herein, to engage and disengage the motor of the EDB actuator. Embodiments of the bi-directional over-running clutch disclosed herein may operate in a downhole, or fracking zone environment and be capable to backdrive the EDB actuator without applying torque to the motor.

A flowline 120 coupled to the wellhead 118 of wellbore 102 and a separator 122 may allow the fluid produced up the tubular string 106 to flow to the separator 122. The separator 122 may be designed to separate the phases of the fluid produced from the wellbore 102. For instance, oil, water, and gas may be separated from each other after passing through the separator 122. The aggregate of fluid produced from wellbore 102 may then flow to a tank battery, via flowline 124, that may include components such as storage tank 126, to store the produced fluid.

Figure 2:
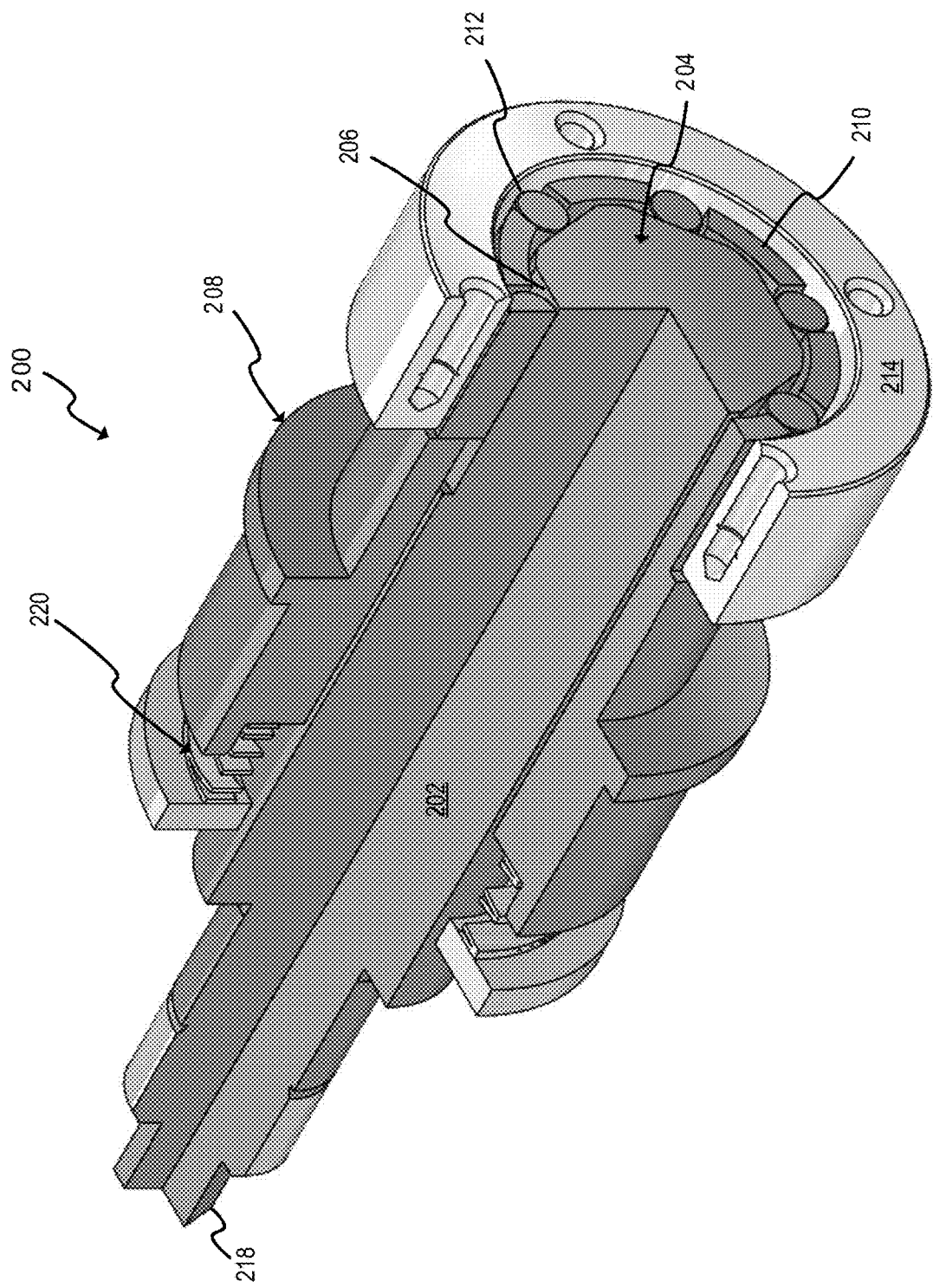
FIG. 2 is a perspective, partial cutaway view of one embodiment of a bi-directional over-running clutch, according to some embodiments.

FIG. 2 is a partial cut-way view of one embodiment of a bi-directional overrunning clutch 200. The clutch 200 includes an input shaft 202 having a multi-surface profile 204 at a distal end thereof and an end journal 218 on an opposing end. The multi-surface profile 204 has a plurality of engagement surfaces 206. In the illustrated embodiments, the multi-surface profile is a hexagonal profile with six engagement surfaces 206, but other embodiments may have more or less engagement surfaces. Similarly, the end journal 218 may have a hexagonal shape or other shape. A clutch body 208 includes a cage 210 at a distal end thereof. The cage 210 may be positioned about the multi-surface profile 204. The cage may house a plurality of rollers 212 configured to engage the plurality of engagement surfaces 206 when the input shaft 202 rotates. An output shaft 214 is coupled with the clutch body 208 about the cage 210. When the input shaft 202 rotates, the plurality of rollers 212 engage the plurality of engagement surfaces 206 thereby transferring motion and torque to the output shaft 214 such that the output shaft 214 rotates in a same direction as the input shaft 202. The clutch 200 may have three operating modes: overrunning (may also be idle), clockwise, and counterclockwise, which will be illustrated and described in more detail in FIG. 3A-3C.

The clutch 200 may use an anti-rotational friction force on the cage 210, which allows the input shaft 202 to automatically switch rotational direction. Some embodiments of the clutch 200 may also include a friction mechanism 220 positioned in an opening of a proximal end of the body 208. The friction mechanism 220 may be used to create the anti-rotational friction force to provide a resistance opposite to the rotating movement of the cage 210 until interference contact between the input shaft 202, rollers 212, and the output shaft 214 has been reached. The friction mechanism 220 may be generated by axial load and coefficient of friction. The axial load may be provided by different mechanisms, such as, for example, a helicoidal or Belleville spring, magnets, interference contact with some bushing, etc.

Embodiments of the clutch 200 disclosed herein may provide an engagement system independently for each actuator. Embodiments of the clutch 200 may also withstand operating temperatures in a downhole environment between −18° C. to 200° C. and a pressurized environment of 20,000 psi. The clutch 200 may also operate even when submerged in a dielectric fluid or other oils, such that the clutch 200 and an actuator coupled with the clutch 200 may be chemical compatible while maintaining operational characteristics within the fluid, which may be exposed to a combination of pressure and temperatures. The clutch 200 may also provide high torque capability, and embodiments may provide both temporary and permanent disengagement capabilities for an actuator for which the clutch may be used as an engagement mechanism.

Figure 3C:
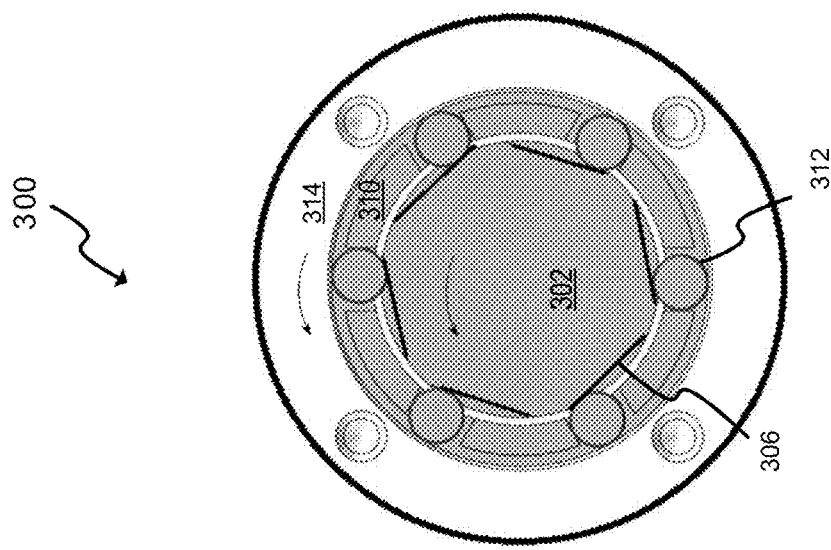
FIG. 3A-3C are front views of one embodiment of a bi-directional over-running clutch shown in three positions, according to some embodiments.
Figure 3B:
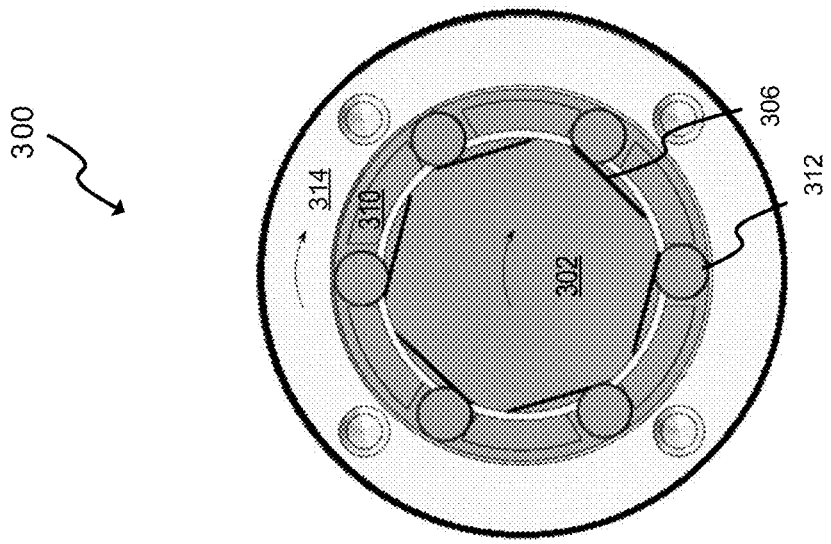
Figure 3A:
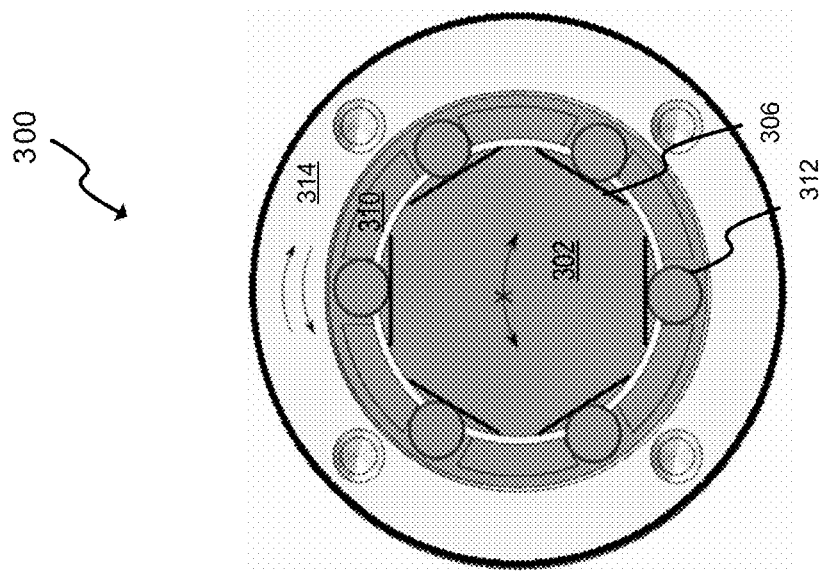

Referring now to FIG. 3A-3C there is shown one embodiment of a bi-directional overrunning clutch 300 shown in different operating modes, an overrunning (or idle) mode and two engaged modes, clockwise (CW) and counterclockwise (CCW). The bi-directional overrunning clutch 300 is constructed similarly to clutch 200 and similar reference numbers are used to relate to similar features. FIG. 3A illustrates the clutch 300 in an overrunning (or idle) mode. In the overrunning mode, output shaft 314 rotates freely, in either a clockwise, or counterclockwise direction. The input shaft 302 does not rotate. As shown here, there is a clearance between rollers 312 positioned in cage 310 and both the output shaft 314 and a plurality of engagement surfaces 306 of an input shaft 302. As such, rollers 312 are not engaged with either the output shaft 314, or input shaft 302 and the rollers 312 are free rolling. In this condition the output shaft 314 can rotate freely without transferring any movement or torque to the input shaft 302 . . . . The rotation of the input shaft 302 enables the clutch 300 to either engage or disengage the actuator.

FIG. 3B illustrates the clutch 300 in the clockwise (CW) mode. As the input shaft 302 rotates, the rollers 312 make contact with and engage a first side of each of the plurality of engagement surface 306. When the input shaft 302 rotates, the rollers are free to move due to the clearance between the input shaft 302, rollers 312 and the output shaft 314. Progressing with the input shaft 302 rotation, the clearance decreases until the rollers 312 engage both the input shaft 302 and output shaft 314, engaging the clutch 300. Once the clutch 300 engages all components will rotate together. Once engaged, the rollers 312 are pushed outward into engagement with the output shaft 314, thereby transferring the CW motion and torque to the output shaft 314 such that the output shaft rotates in the CW direction and all components rotate together.

FIG. 3C illustrates the clutch 300 in the counter-clockwise (CCW) mode. As the input shaft 302 rotates counter-clockwise, the rollers 312 make contact with and engage the plurality of engagement surface 306. Once engaged, the rollers 312 rotate and are pushed outward into engagement with the output shaft 314, thereby transferring the CCW motion and torque to the output shaft 314 such that the output shaft rotates in the CCW direction and all components rotate together.

To ensure the engagement between the rollers 312 and the output shaft 314 and the input shaft 302, a resistance is created opposite to the rotational movement on the cage 310, until the interference contact between the input shaft 302 rollers 312, and the output shaft 314 is reached. The resistance could be a friction mechanism generated by axial load and coefficient of friction, such as the friction mechanism 220 as described.

Referring now to FIG. 4A-4E, there are shown example components which may comprise clutch 200 or clutch 300 shown and described herein. FIG. 4A illustrates an embodiment of an input shaft 402 which includes a multi-surface profile 404 at a distal end thereof and a hexagonal journal 418 on the other end, however any different end journal as a square profile, a spline profile or a shaft with a key may be used. The multi-surface profile 404 has a plurality of engagement surfaces 406. FIG. 4B illustrates one embodiment of a clutch body 408, and more specifically a distal end of the body 408 having a cage 410 for housing a plurality of rollers therein. FIG. 4C illustrates one embodiment of a roller 412 which may be positioned in the cage 410 and engage the engagement surfaces 406 of the input shaft 402.

FIG. 4D illustrates one embodiment of an output shaft 414 which may couple onto the distal end of the clutch body 408 (FIG. 4B) and about the cage 410 (FIG. 4B). The output shaft 414 may include openings 416 for receiving fasteners of a transmission shaft which may be coupled thereto or any different end journal as a square, hexagonal or even a spline profile or a shaft with a key. FIG. 4E illustrates one embodiment of a friction mechanism 420 which may be used with clutch 200. The illustrated friction mechanism 420 is a spring, however it can use any other friction system as for example, a helicoidal or Belleville spring, magnets, interference contact with some bushing, etc.

Figure 5:
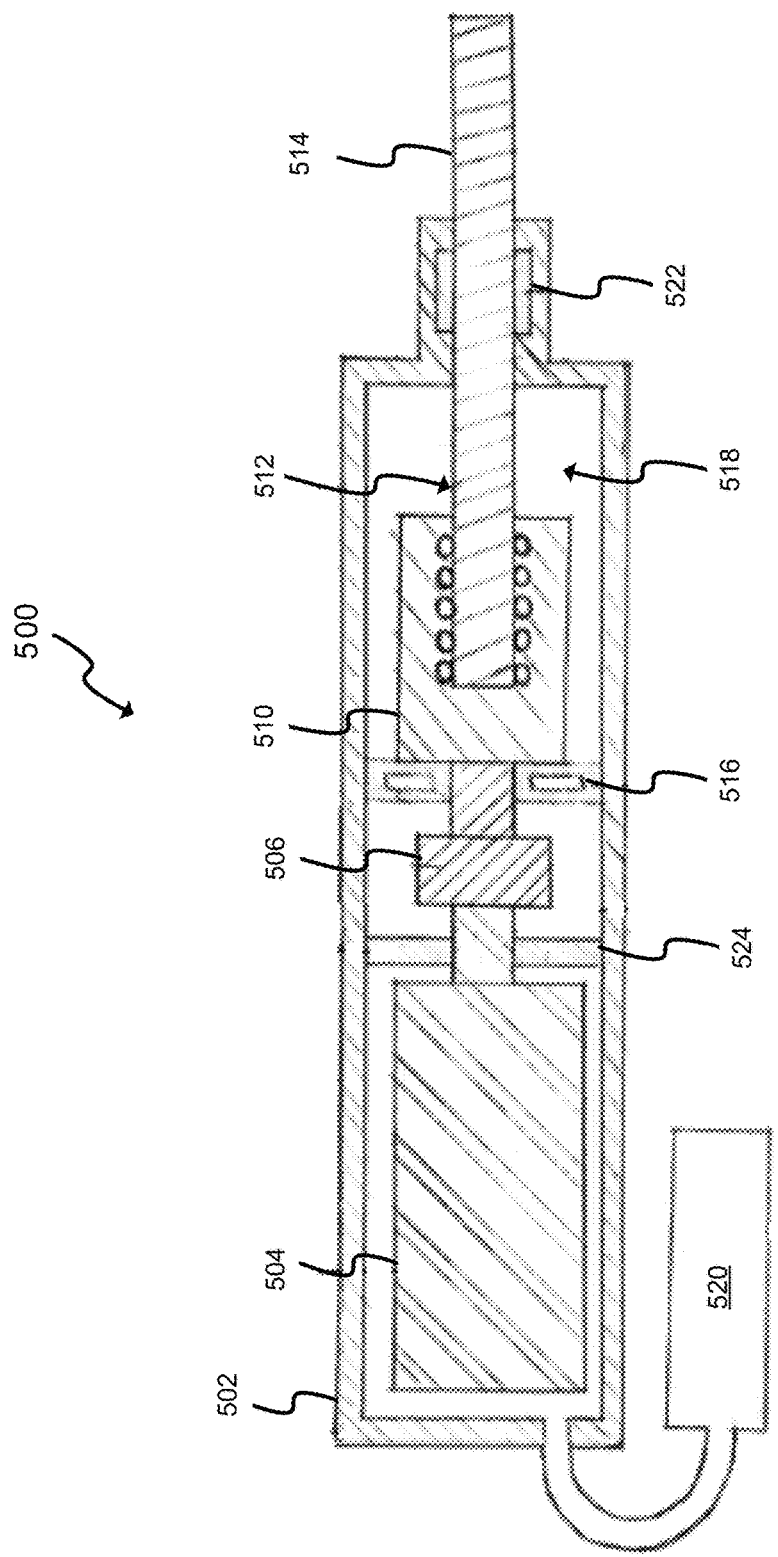
FIG. 5 is a side section view of an electrical downhole backdrivable (EDB) actuator, according to some embodiments.

Referring now to FIG. 5, there is shown one embodiment of an EDB actuator 500 that may be coupled with and used to actuate a target component within a wellbore. The EDB actuator 500 may include a housing 502 including an electric motor 504. The actuator may also include a mechanism to transform linear displacement into rotation, such as a ball nut 510 and ball-screw 512 in this embodiment, transforming rotation into linear displacement and vice-versa, depending on operation mode. An engagement system 506 is coupled with the motor 504 and the ball nut 510 and ball-screw 512 and is configured to both engage and disengage the ball-screw 512 and nut 510. The ball screw 512 comprises a slide rod 514 which may couple with the target component. The ball nut 510 may be supported by a thrust bearing 516. The housing 502 may include at least one inner chamber 518 which may contain a lubricant and/or dielectric oil. As the oil is compressed and expanded by pressure and temperature, the volume change or displacement of the oil may be compensated by at least one compensator 520 fluidly connected with the inner chamber 518. The compensator 520 may include at least one of a bellows, a piston, a bladder, or diaphragm components. In some embodiments, a dynamic sealing system 522 may be positioned in one end of the housing 502 to seal the inner chamber 518 from the external environment in the wellbore (such as the annulus or tubing). In some embodiments, the inner chamber 518 may also include a rotating seal 524 to provide additional sealing to protect against contamination of the oil where electrical components are placed.

In other embodiments, the engagement system 506 may comprise a free-wheeling hub that applies torque in a first direction from the motor 504 toward the ball nut 510 to transform rotation into linear displacement, but then the freewheeling hub rotates freely when torque is applied in a second direction from the ball nut toward the motor. In other embodiments, the engagement system 506 may comprise a two-way ratchet clutch acting in the same way as explained for two-way clutch and free-wheeling hub.

In still another embodiment, the ball-screw 512 and ball nut 510 may be replaced with a planetary roller screw and nut, and may be engaged by the engagement system 506, which may be a bi-directional overrunning clutch such as clutch 200, or a free-wheeling hub, or a two-way ratchet clutch.

In still another embodiment, the ball-screw 512 and ball nut 510 may be replaced with a planetary roller screw and nut, and may be engaged by the engagement system 508, which may be a bi-directional overrunning clutch such as clutch 200, or a free-wheeling hub, or a two-way ratchet clutch.

Figure 6:
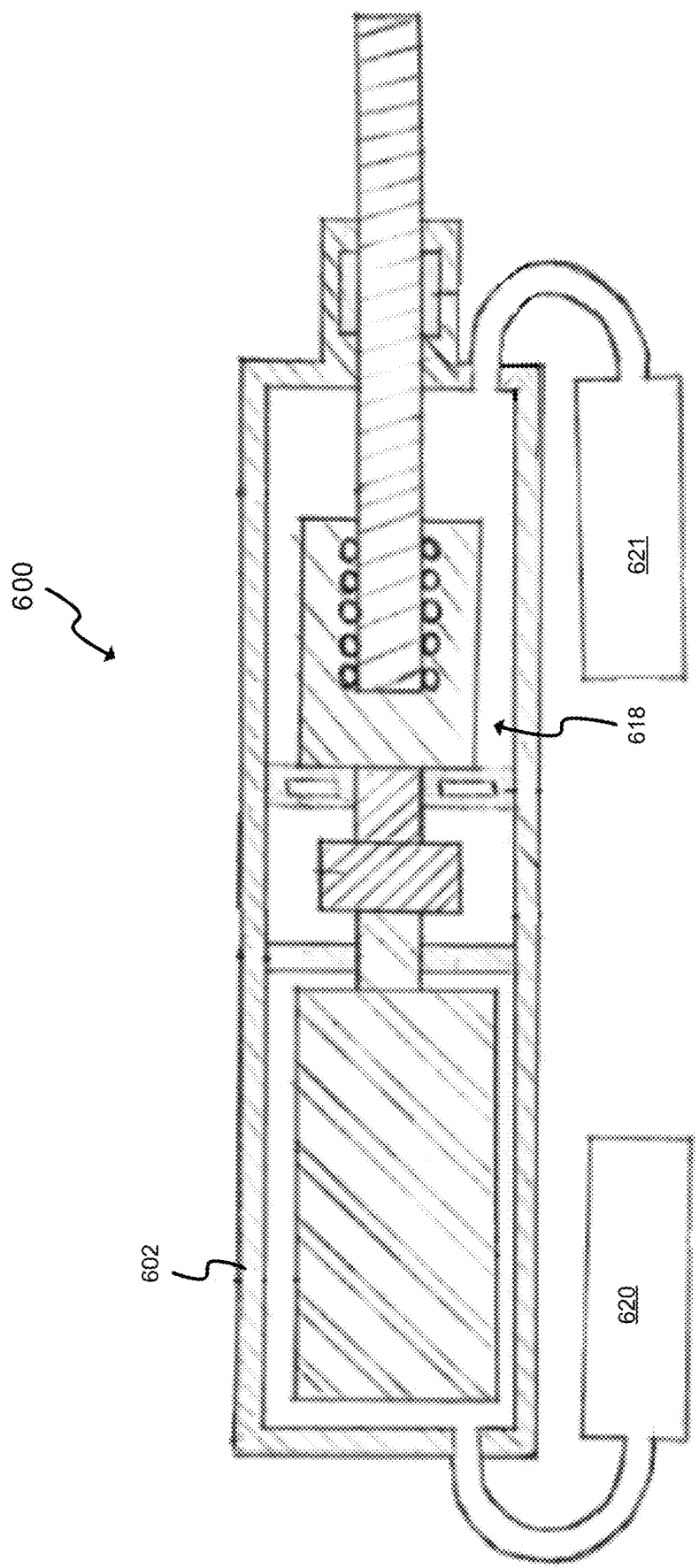
FIG. 6 is a side section view of another embodiment of an EDB actuator.

Referring now to FIG. 6, there is shown another embodiment of an EDB actuator 600 according to some embodiments. The EDB actuator 600 is similar to EDB actuator 500 but may an inner chamber 618 of housing 602 may be fluidly coupled with a first compensator 620 and a second compensator 621 to compensate for volume change or displacement of oil/dielectric oil in the inner chamber 618 as the oil is compressed and expanded by pressure and temperature.

Embodiments of the Bi-directional Overrunning Clutch and EDB actuator disclosed herein may be used in several downhole applications and situations. Embodiments of the clutch/engagement system and EDB actuator may be used when a redundancy system is required, such as in FIGS. 7A and 7B and/or suitable for field intervention if needed, such as illustrated in FIG. 8.

Figures 7A, 7B:
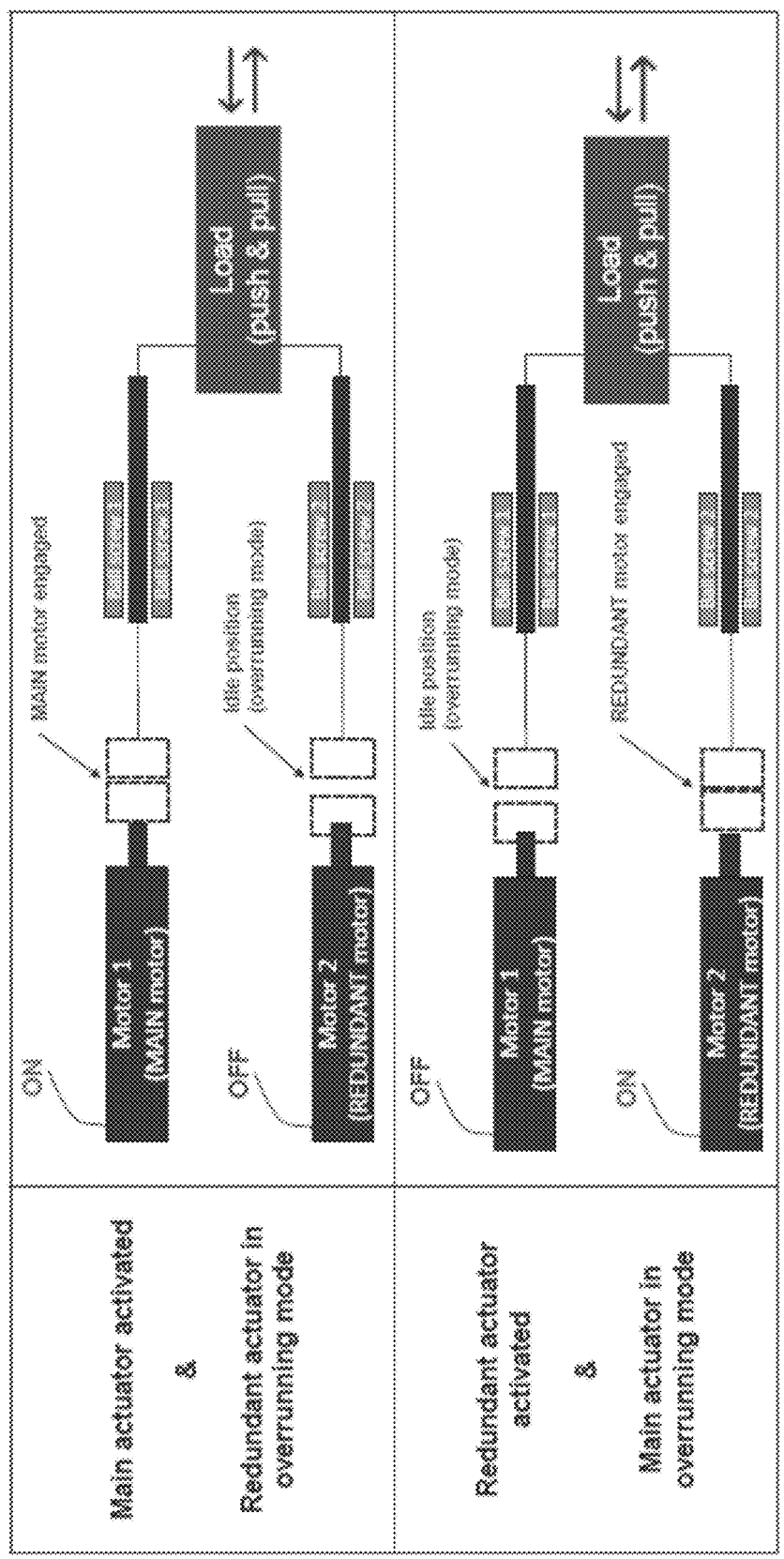
FIG. 7A-7B are system diagrams illustrating different systems employing an EDB actuator and a clutch, according to some embodiments.

Referring now to FIG. 7A, there is shown an example of a bi-directional overrunning clutch used as an engagement system with a downhole target mechanism, when one redundant actuator is used. In this example when required to run the Actuator, Motor 1, Motor 2 is turned off and disengaged from Ball Nut 2 by Clutch 2, so Motor 1 is able to move the required load (related to actuating the downhole target mechanism) without jeopardizing, stressing or moving the Motor 2. These downhole systems may include two or more actuators. In FIG. 7A, the main actuator is activated and the main motor, Motor 1, is ON. The redundant actuator is in overrunning mode and the redundant motor, Motor 2 is OFF. This system is able to push and pull the load with the ball screw of the main actuator.

Referring now to FIG. 7B, there is shown another example of a bi-directional overrunning clutch used as an engagement system with a downhole target mechanism when one redundant actuator is used. In this example when required to run the Actuator, Motor 2, the Motor 1 is turned off and disengaged from Ball Nut 1 by Clutch 1, so Motor 2 is able to move the required load (related to actuating the downhole target mechanism) without jeopardizing, stressing, or moving the Motor 1. These downhole systems may include two or more actuators. In FIG. 7B, the main actuator is in overrunning mode and the main, Motor 1, is OFF. The redundant actuator is activated and the redundant motor, Motor 2 is ON. This system is able to push and pull the load with the ball screw of the redundant actuator. In some other examples, both Motor 1 and Motor 2 may operate together.

Figure 8:
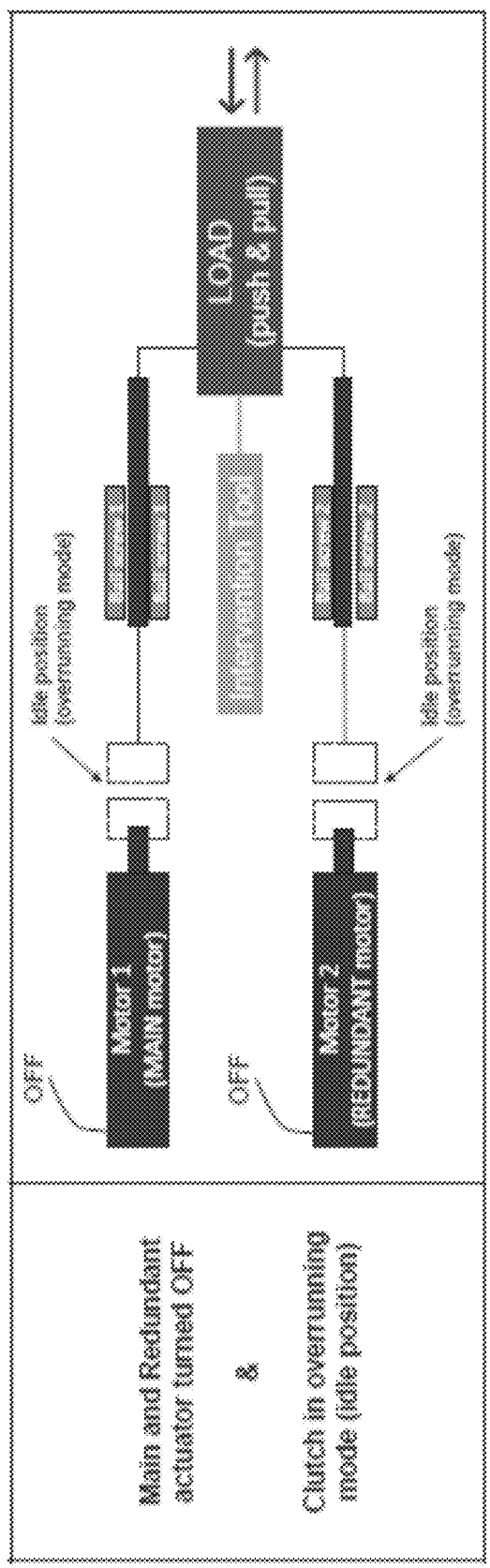
FIG. 8 is a system diagram illustrating another system employing an EDB actuator and a clutch, according to some embodiments.

Referring now to FIG. 8, there is shown an example of a bi-directional overrunning clutch used as an engagement system when an intervention may be required to operate a target mechanism positioned downhole, such as e.g., a valve. The system includes a main actuator and a redundant actuator. Both the main and redundant actuators and the motors are OFF and the Load can be applied through an intervention tool without any transfer or movement of the main and redundant motors. In this scenario both engagement systems of the actuators will be in the overrunning mode (idle position). Once the intervention tool has completed the required actuation, the intervention tool may be removed the main and redundant actuators and motors maintain their normal functions and can be used for further actuation as required (as shown and discussed in FIGS. 7A and 7B). Insertion of an intervention tool may be triggered by manual user intervention or may be triggered upon review of measurements taken from downhole tools that indicate intervention may be needed.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Example Embodiments

Aspects disclosed herein include: [to be completed after draft approved by inventors—basically replicates the claim language]

Aspect A: A clutch for use in a downhole environment, comprising an input shaft, the input shaft having a multi-surface profile at a distal end thereof, the multi-surface profile having a plurality of engagement surfaces; a body, the body comprising; a cage at the distal end of the body and positioned around the input shaft; and a plurality of rollers within the cage; and an output shaft coupled with the body; wherein the plurality of rollers are configured to engage the plurality of engagement surfaces as the output shaft rotates.

Aspect B: An electrical downhole backdrivable actuator, comprising an actuator housing; a motor positioned within the actuator housing; a dynamic sealing system; a ball screw and a ball nut; and an engagement mechanism coupled with the motor, a mechanism to transform rotation to linear movement; wherein the mechanism to transform rotation to linear movement includes a slide rod extending from a distal end of the actuator housing and through the dynamic sealing system, the slide rod configured to connect a target mechanism Aspect C: downhole system, comprising: a target mechanism; and an actuator coupled with the target mechanism wherein the actuator comprises: an actuator housing; a motor positioned within the housing; a dynamic sealing system; a ball screw and a ball nut; and an engagement mechanism coupled with the motor, ball screw and ball nut; wherein the ball screw includes a slide rod extending from a distal end of the actuator housing and through the dynamic sealing system, the slide rod configured to connect with the target mechanism.

Aspects A, B, and C may have one or more of the following additional elements in combination:

Element 1: wherein further comprising a friction mechanism.

Element 2: wherein the friction mechanism is one of a helicoidal spring, a Belleville spring, and a magnet.

Element 3: wherein the plurality of rollers are disengaged from both the input shaft and the output shaft in an over-running mode.

Element 4: wherein the output shaft rotates freely while the plurality of rollers are disengaged from the input shaft.

Element 5: wherein the input shaft rotates in a same direction as the output shaft when the clutch is in an engaged mode.

Element 6: wherein the engaged mode is one of clockwise or counterclockwise.

Element 7: wherein the mechanism to transform rotation to linear movement comprises a ball screw and ball nut.

Element 8: wherein the actuator housing includes an inner chamber having a dielectric oil therein.

Element 9: further comprising at least one compensator fluidly coupled with the inner chamber.

Element 10: further comprising a rotating seal positioned between the motor and the ball screw and ball nut.

Element 11: wherein the engagement mechanism is a bi-directional overrunning clutch comprising: an input shaft, the input shaft having a multi-surface profile at a distal end thereof, the multi-surface profile having a plurality of engagement surfaces; a clutch body, the body comprising; a cage at a distal end of the clutch body and positioned around the input shaft; and a plurality of rollers within the cage; and an output shaft coupled with the clutch body; wherein the plurality of rollers are configured to engage the plurality of engagement surfaces and the output shaft as the input shaft rotates.

Element 12: wherein the engagement mechanism is a freewheeling hub.

Element 13: wherein the engagement mechanism is a two-way ratchet clutch.

Element 14: wherein the mechanism to transform rotation to linear movement comprises a planetary screw and roller, and wherein the engagement system is one of a bi-directional overrunning clutch, a freewheeling hub, and a two-way ratchet clutch.

Element 15: wherein the target mechanism is an interval control valve.

Element 16: further comprising a second (redundant) actuator coupled with the target mechanism.

Element 17: further comprising an intervention tool configured to latch the target mechanism.

The invention claimed is:

1. A clutch:
the clutch configured to be positioned in a downhole environment and coupled with a downhole tool, the clutch comprising:
an input shaft, the input shaft having a multi-surface profile at a distal end thereof, the multi-surface profile having a plurality of engagement surfaces;
a body, the body comprising;
a cage at the distal end of the body and positioned around the input shaft; and
a plurality of rollers within the cage; and
an output shaft coupled with the body, the output shaft coupled with an actuator of the downhole tool;
wherein the plurality of rollers are configured to engage the plurality of engagement surfaces as the output shaft rotates.

2. The clutch according to claim 1, further comprising a friction mechanism.

3. The clutch according to claim 2, wherein the friction mechanism is one of a helicoidal spring, a Belleville spring, and a magnet.

4. The clutch according to claim 1, wherein the plurality of rollers are disengaged from both the input shaft and the output shaft in an overrunning mode.

5. The clutch according to claim 4, wherein the output shaft rotates freely while the plurality of rollers are disengaged from the input shaft.

6. The clutch according to claim 1, wherein the input shaft rotates in a same direction as the output shaft when the clutch is in an engaged mode.

7. The clutch according to claim 6, wherein the engaged mode is one of clockwise or counterclockwise,
as the input shaft rotates.

8. The clutch according to claim 1, wherein the downhole tool is a valve, a sliding sleeve, a latch system, packer, or flapper.

9. An actuator:
the actuator being an electrical backdrivable actuator configured to be positioned in a downhole environment of a wellbore, the actuator comprising:
an actuator housing;
a motor positioned within the actuator housing;
a dynamic sealing system;
an engagement mechanism coupled with the motor; and
a mechanism for transforming rotation into linear displacement, the mechanism comprising a slide rod extending from a distal end of the actuator housing and through the dynamic sealing system, the slide rod configured to connect a target mechanism;
wherein the engagement mechanism is a bi-directional overrunning clutch comprising:
an input shaft, the input shaft having a multi-surface profile at a distal end thereof, the multi-surface profile having a plurality of engagement surfaces;
a clutch body, the body comprising;
a cage at a distal end of the clutch body and positioned around the input shaft; and
a plurality of rollers within the cage; and
an output shaft coupled with the clutch body;
wherein the plurality of rollers are configured to engage the plurality of engagement surfaces and the output shaft.

10. The actuator according to claim 9, wherein the actuator housing includes an inner chamber having a dielectric oil therein.

11. The actuator according to claim 10, further comprising at least one compensator fluidly coupled with the inner chamber.

12. The actuator according to claim 9, further comprising a rotating seal positioned between the motor and a ball screw and ball nut.

13. The actuator according to claim 9, wherein the target mechanism is an interval control valve, a sliding sleeve, a packer, a latch system, or a flapper.

14. The actuator according to claim 9, wherein the mechanism for transforming rotation into linear displacement into rotation is one of:
a ball screw and nut, or a planetary screw and roller.

15. A downhole system, comprising:
a target mechanism positioned in a wellbore; and
a backdrivable actuator coupled with the target mechanism wherein the actuator comprises:
an actuator housing;
a motor positioned within the housing;
a dynamic sealing system;
a ball screw and a ball nut; and
an engagement mechanism coupled with the motor, ball screw and ball nut;
wherein the ball screw includes a slide rod extending from a distal end of the actuator housing and through the dynamic sealing system, the slide rod configured to connect with the target mechanism;
wherein the engagement mechanism is one of a bi-directional overrunning clutch comprising:
an input shaft, the input shaft having a multi-surface profile at a distal end thereof, the multi-surface profile having a plurality of engagement surfaces;
a clutch body, the body comprising;
a cage at a distal end of the clutch body and positioned around the input shaft; and
a plurality of rollers within the cage; and
an output shaft coupled with the clutch body;
wherein the plurality of rollers are configured to engage the plurality of engagement surfaces and the output shaft as the input shaft rotates.

16. The downhole system according to claim 15, wherein the target mechanism is an interval control valve, a sliding sleeve, a packer, a latch system, or a flapper.

17. The downhole system according to claim 15, further comprising a second actuator coupled with the target mechanism.

18. The downhole system according to claim 15, further comprising an intervention tool configured to latch the target mechanism.

* * * * *